US011228222B2

(12) United States Patent
Patel et al.

(10) Patent No.: US 11,228,222 B2
(45) Date of Patent: Jan. 18, 2022

(54) WEDGES WITH Q-AXIS DAMPER CIRCUITS

(71) Applicant: Hamilton Sundstrand Corporation, Charlotte, NC (US)

(72) Inventors: Dhaval Patel, Schaumburg, IL (US); Andreas C. Koenig, Rockford, IL (US); Andrew R. Wilkinson, Cherry Valley, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 49 days.

(21) Appl. No.: 16/745,938

(22) Filed: Jan. 17, 2020

(65) Prior Publication Data

US 2020/0259390 A1 Aug. 13, 2020

Related U.S. Application Data

(62) Division of application No. 15/470,525, filed on Mar. 27, 2017, now Pat. No. 10,541,580.

(51) Int. Cl.
*H02K 3/48* (2006.01)
*H02K 3/52* (2006.01)
(Continued)

(52) U.S. Cl.
CPC ............ *H02K 3/527* (2013.01); *H02K 1/24* (2013.01); *H02K 1/26* (2013.01); *H02K 3/12* (2013.01); *H02K 3/20* (2013.01); *H02K 3/487* (2013.01); *H02K 3/50* (2013.01); *H02K 15/022* (2013.01); *H02K 15/165* (2013.01); *H02K 55/04* (2013.01)

(58) Field of Classification Search
CPC .. H02K 3/00; H02K 3/12; H02K 3/18; H02K 3/46; H02K 3/48; H02K 3/52; H02K 3/527; H02K 15/00; H02K 15/12
See application file for complete search history.

(56) References Cited

U.S. PATENT DOCUMENTS

| 4,028,574 A | 6/1977 | Canay |
| 5,140,204 A | 8/1992 | Cashmore et al. |

(Continued)

FOREIGN PATENT DOCUMENTS

| CN | 103532269 A | 1/2014 |
| EP | 3007321 A1 | 4/2016 |

OTHER PUBLICATIONS

Extended European Search Report dated Aug. 24, 2018, issued during the prosecution of corresponding European Patent Application No. 18163193.8.

*Primary Examiner* — Tran N Nguyen
(74) *Attorney, Agent, or Firm* — Locke Lord LLP; Joshua L. Jones; Scott D. Wofsy

(57) ABSTRACT

A rotor for an electrical machine includes a rotor core having a plurality of circumferentially spaced apart rotor poles. Windings are seated in gaps between circumferentially adjacent pairs of the rotor poles. A wedge secures the windings in each gap. The wedge includes a first member made of a first material and at least one second member made of a second material. The second material has a higher electrical conductivity than the first material. The wedge is configured to supply Q-axis damping. A pair of end plates is connected electrically to the at least one second member at opposing longitudinal ends thereof thereby completing a Q-axis winding circuit for each wedge.

10 Claims, 3 Drawing Sheets

(51) Int. Cl.
  *H02K 3/487*   (2006.01)
  *H02K 3/50*    (2006.01)
  *H02K 3/12*    (2006.01)
  *H02K 1/26*    (2006.01)
  *H02K 55/04*   (2006.01)
  *H02K 1/24*    (2006.01)
  *H02K 15/02*   (2006.01)
  *H02K 15/16*   (2006.01)
  *H02K 3/20*    (2006.01)

(56) References Cited

U.S. PATENT DOCUMENTS

| | | | | |
|---|---|---|---|---|
| 5,469,009 | A * | 11/1995 | Wakui | H02K 1/265 |
| | | | | 310/179 |
| 2004/0263019 | A1* | 12/2004 | Buchan | H02K 3/527 |
| | | | | 310/214 |
| 2005/0231058 | A1* | 10/2005 | Down | H02K 3/527 |
| | | | | 310/192 |
| 2016/0099621 | A1* | 4/2016 | Himmelmann | H02K 1/28 |
| | | | | 310/114 |

* cited by examiner

WEDGES WITH Q-AXIS DAMPER CIRCUITS

CROSS-REFERENCE TO RELATED APPLICATIONS

This application is a divisional of U.S. patent application Ser. No. 15/470,525 filed Mar. 27, 2017 now issued as U.S. Pat. No. 10,541,580 on Jan. 21, 2020, which is incorporated by reference herein in its entirety.

BACKGROUND OF THE INVENTION

1. Field of the Invention

The present disclosure relates to electrical machines, and more particularly to quadrature axis (Q-axis) damping in electrical machines.

2. Description of Related Art

One of the problems that face synchronous machines is the ability to reject disturbances caused by speed transients or load fluctuations and imbalances. In response to the electrical and mechanical disturbances, conventional synchronous machines have damper bars embedded into the rotors. The typical practice is to embed the damper bars in the direct axis of salient pole generators. However, this leaves the Q-axis undamped because the windings occupy the space between the poles of the rotor and it is typical to insert a wedge in the gap to hold the windings in place.

For high speed applications of electrical machines such as motors and generators, Q-axis damper windings are not practical because the wedge that holds the windings in place occupies the space where the Q-axis damper winding would occupy. The wedges are typically made of Inconel or titanium which is consistent in regards to poor conducting materials. In low speed applications, electrically conductive materials such as aluminum or copper can be used for the wedges. But these materials lack the strength needed in high speed, and/or high temperature applications. Additionally, the conductive wedge materials used in conventional low speed applications are typically electrically connected using braze joints, which are not strong enough for high speeds.

The conventional techniques have been considered satisfactory for their intended purpose. However, there is an ever present need for improved Q-axis damping. This disclosure provides a solution for this problem.

SUMMARY OF THE INVENTION

A rotor for an electrical machine includes a rotor core having a plurality of circumferentially spaced apart rotor poles. Windings are seated in gaps between circumferentially adjacent pairs of the rotor poles. A wedge secures the windings in each gap. The wedge includes a first member made of a first material and at least one second member made of a second material. The second material has a higher electrical conductivity than the first material. The wedge is configured to supply Q-axis damping. A pair of end plates is connected electrically to the at least one second member at opposing longitudinal ends thereof thereby completing a Q-axis winding circuit for each wedge. The first member and the at least one second member can be configured with no clearance space therebetween The first material can have a higher mechanical strength than that of the second material. The first material can have a higher melting or glass transition temperature than that of the second material. At least one electrically conductive damper bar can extend along an outer portion of each of the rotor poles, wherein each damper bar is connected electrically to the end plates for D-axis damping. The second material of the wedges and the damper bars provide the rotor with full 360° damping, circumferentially.

The second material in each wedge can form a wedge damper bar extending axially through the respective wedge. The at least one second member can be a Q-axis damper bar extending axially through the respective first member The second material in each wedge can form a plurality of damper bars extending axially through the respective wedge. The at least one second member can be a plurality of second members extending axially through the respective first member. The second material in each wedge can form at least one damper bar extending axially through the respective wedge, wherein at least one damper bar has an axial cross-section with a perimeter shaped for optimizing skin effect. The at least one second member can have an axial cross-section with a perimeter shaped for optimizing skin effect, for example arc shaped. The at least one second member can be intimately radially surrounded by the first member.

Each wedge can have two axially opposed end portions of a third material with more electrically conductive material than the first material for electrical connection between the second member and the end plates, e.g., the third material can be the same material as the second material. Each wedge can be manufactured by combining the first and second materials, e.g., by additive manufacturing.

A method of manufacturing a rotor wedge on an electrical machine includes additive manufacturing of a wedge body with layers that include a first material and a second material having a higher electrical conductivity forming a damper bar in the wedge body. Additive manufacturing can combine dissimilar materials into each layer, such as using a material with higher electrical conductivity than that of the first material on axially opposed end portions of the wedge body for electrical connection of the damper bar with end plates of a rotor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
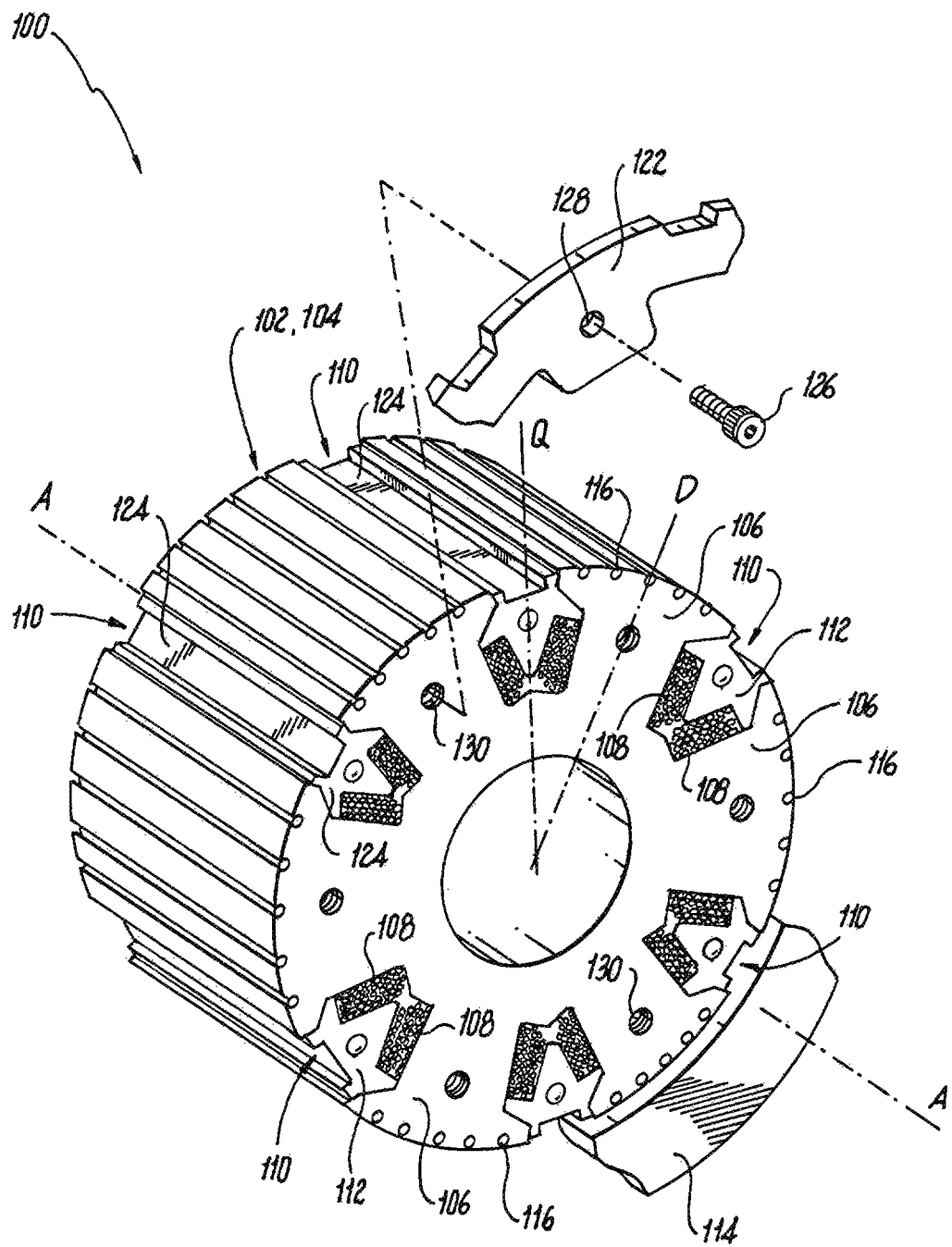
FIG. 1 is a schematic perspective view of an exemplary embodiment of apportion of an electrical machine constructed in accordance with the present disclosure, showing the D-axis and the Q-axis on a rotor.

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 100. Other embodiments of electrical machines in accordance with the disclosure, or aspects thereof, are provided in FIGS. 2-3, as will be described. The systems and methods described herein can be used to provide quadrature axis (Q-axis) damping in high speed rotors of electrical machines where traditional rotors either lack Q-axis damping, or have some Q-axis damping structure that is too mechanically weak to support high speeds, e.g., 20,000 to 50,000 RPM.

A rotor 102 for the electrical machine 100 includes a rotor core 104 having a plurality of circumferentially spaced apart rotor poles 106. Windings 108 are seated in gaps 110 between circumferentially adjacent pairs of the rotor poles 106. A respective wedge 112 secures the windings 108 in each gap 110. The rotor 102 rotates about axis A under forces created by stator 114 in a motor, or in a generator, the rotor 102 is driven by a prime mover. D-axis damper bars 116, only some of which are labeled in FIG. 1 for sake of clarity, are provided in each of the poles 106 to provide damping for the D-axis in each pole 106, where one of the D-axes is identified in FIG. 1, which is the axis for the main flux for driving rotor 106 about axis A. Additional damper bars, e.g., as second member 120 described below, are provided in the materials of the wedges 112 to provide damping in the quadrature axis (Q-axis) through each gap 110, where one of the Q-axes is shown in FIG. 1.

Figure 2:
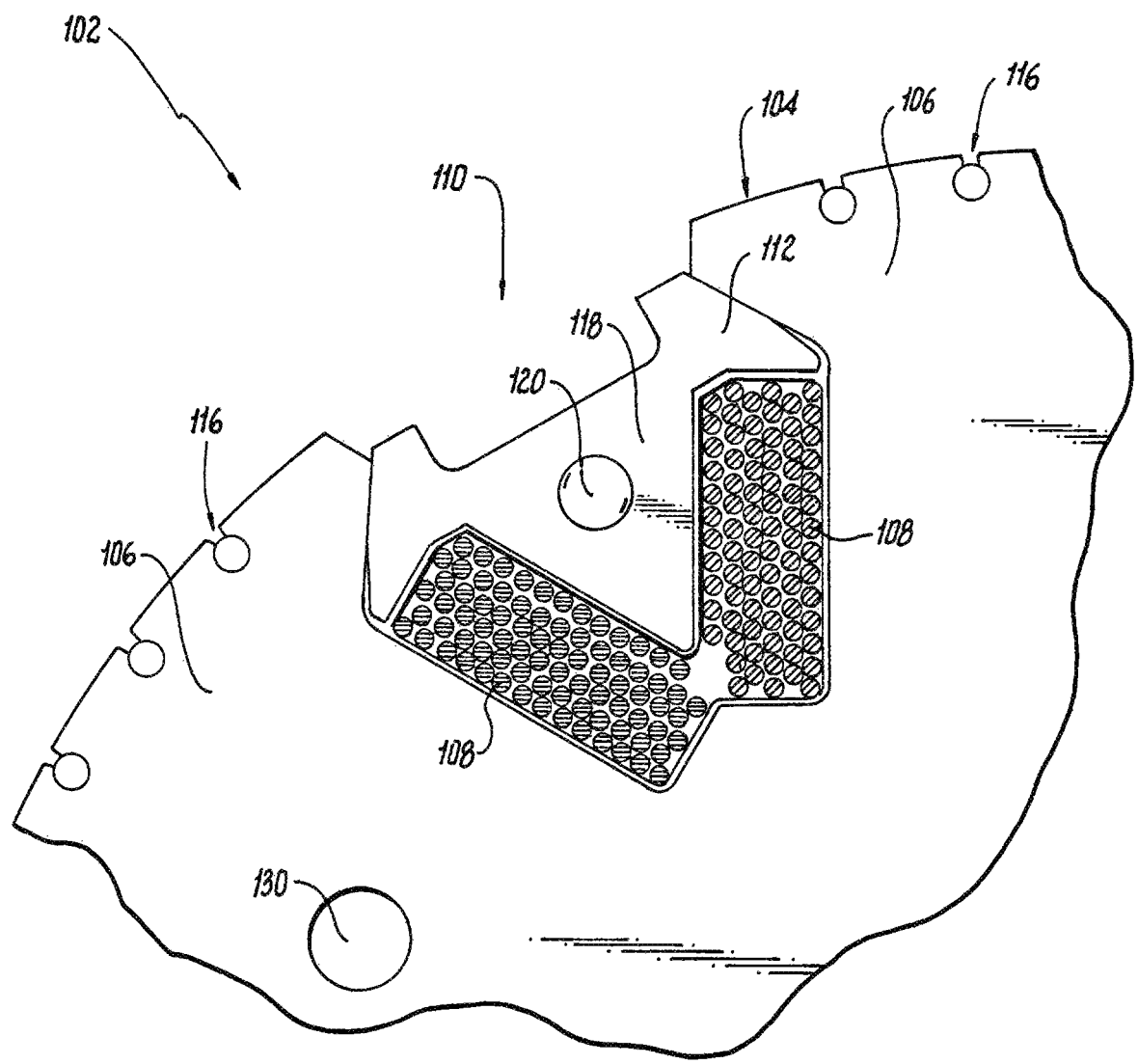
FIG. 2 is a schematic end elevation view of a portion of the rotor of FIG. 1, showing the damper bar in the wedge.
Figure 3:
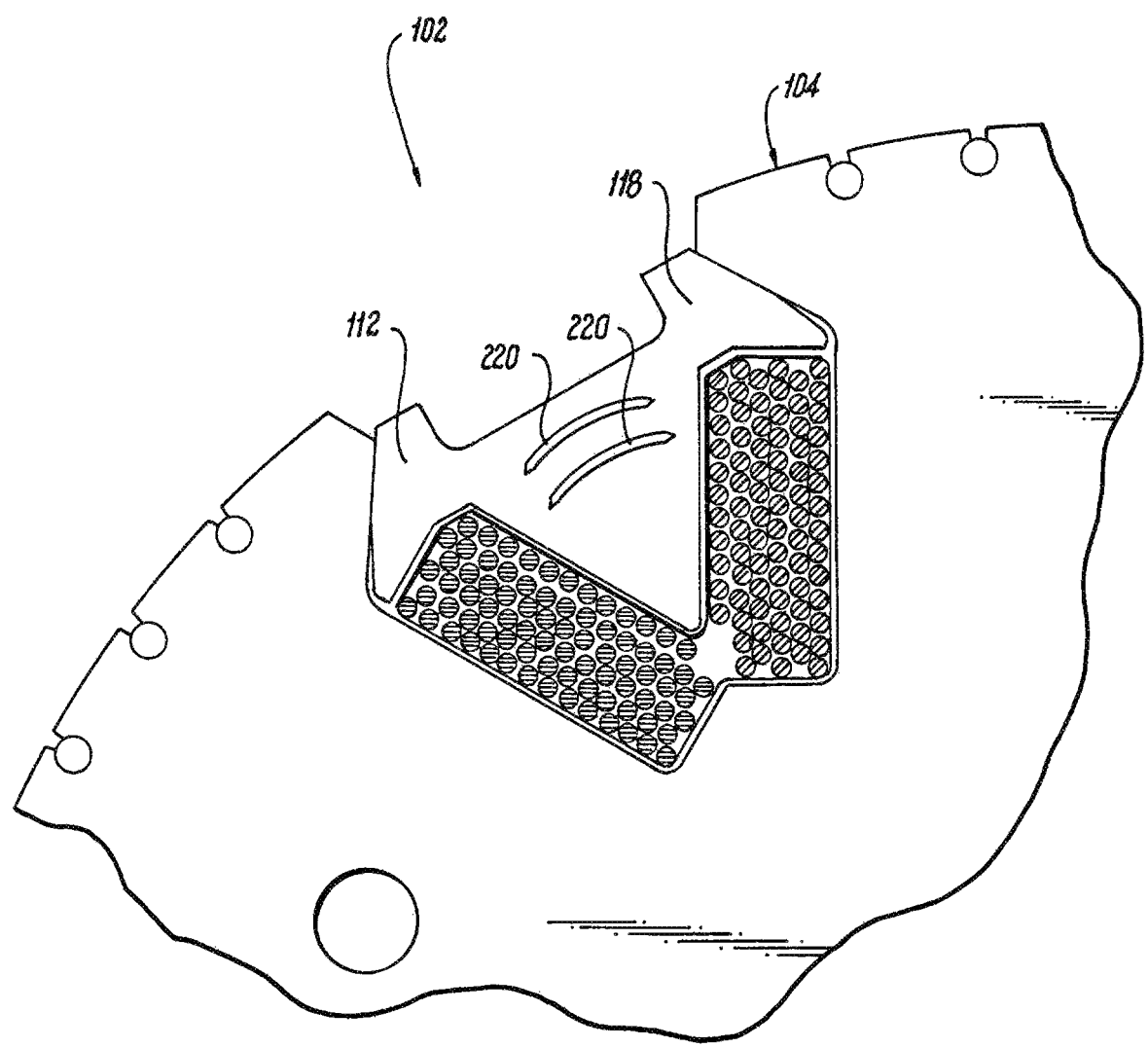
FIG. 3 is a schematic end elevation view of a portion of the rotor of FIG. 1, showing another exemplary embodiment of a damper bar in the wedge.

With reference now to FIG. 2, each wedge 112 includes a first member 118 made of a first material, such as titanium or Inconel, and a second member 120 made of a second material, such as copper, beryllium copper, or aluminum, with a higher electrical conductivity than that of the first material forming a damper bar for Q-axis damping. A pair of end plates 122, one of which is shown in FIG. 1, is electrically connected to the second member 120 of each of the wedges 110 to complete a Q-axis winding circuit for each wedge 110.

The first member 118 has a higher mechanical strength than that of the second member 120, providing strength for high speed rotation and/or high temperature operation, and the high electrical conductivity of the second material provides the electrical circuit for the Q-axis damper windings. It is also contemplated that the first material can have a higher melting or glass transition temperature than that of the second material. With electrically conductive damper bars 116 extending along an outer portion of each of the rotor poles 106, wherein each damper bar is 116 electrically connected to the end plates 122 for D-axis damping, and with the second member 120 of the wedges 112, the collective damper bars 116/120 provide the rotor 102 with full 360° damping, where 360° is in reference to the direction wrapping circumferentially around rotation axis A of FIG. 1.

The second member 120 in each wedge 112 forms a wedge damper bar extending axially through the respective wedge 112 from end to end. As shown in another embodiment shown in FIG. 3, the second member 120 in each wedge 112 can form a plurality of damper bars 220 each forming an arc-shaped cross-section extending axially through the respective wedge 112. The axial cross-sections of damper bars 220 have with a perimeter shaped for optimizing skin effect by the geometrical layout of the damper bar and the material selection. The at least one second member 120 is intimately radially surrounded by the first member 118. Those skilled in the art will readily appreciate that this cross-sectional shape can be optimized for any given application. This adds a large amount of Q-axis transient inductance, which improves the transient performance of synchronous machines in accordance with this disclosure over conventional configurations. The shape can also be optimized to take advantage of the span/cross-sectional area available in the wedges 112.

With reference again to FIG. 1, each wedge 112 can have two axially opposed end portions 124 of a third material more electrically conductive than the first member 118 for electrical connection between the second member 120 and the end plates 122. For example, each wedge including the first and second members 118 and 120 can be additively manufactured, and layers of copper or other suitable conductor can be additively manufactured to form the axial end portions 124 of each wedge 112. The third material can be the same material as the second material or a different material from the second material. The wedges 112 can each be formed with n clearance space between the first and second members 118 and 120 thereof, e.g., by additive manufacturing. Then end plates 122 can be bolted to each end of rotor 102 as indicated by the bolt 126 and bolt holes 128 an 130 in FIG. 1, and the end portions 124 will electrically connect the second members 120 in each wedge 122 with the end plates 122 to form Q-axis damping winding circuits. The plates 122 can welded rather than bolted to make the electrical connection in applications that require less structural capability. It is also contemplated that the plates 122 can be a ring that is pressed onto the outer diameter of the wedges 122 making contact via the interference fit to provide the electrical connection with the second member 120 in each wedge 122.

Conventional high speed systems are utilized for high voltage DC and variable speed constant frequency systems. These systems require rectification, and the additional damper circuits as disclosed herein reduce the commutating resistance, thus making for more efficient systems than is possible with the conventional configurations.

The methods and systems of the present disclosure, as described above and shown in the drawings, provide for Q-axis damping with superior properties including full 360° damping coverage with mechanical strength for high speed and/or high temperature electrical machines, providing better performance for high voltage DC and variable speed constant frequency systems than traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A wedge for a rotor in an electrical machine comprising:
   a wedge including a first member made of a first material and at least one second member made of a second material, the second material having a higher electrical conductivity than that of the first material, the wedge being configured to supply Q-axis damping, wherein the second member does not extend outside of the first member as a fastener, and wherein the second member can be electrically connected to an end ring, but does not act as a fastener to the end ring.

2. The wedge as recited in claim 1, wherein the first material has a higher mechanical strength than that of the second material.

3. The wedge as recited in claim 1, wherein the second material in each wedge forms a wedge damper bar extending axially through the respective wedge.

4. The wedge as recited in claim 1, wherein the second material in each wedge forms a plurality of damper bars extending axially through the respective wedge.

5. The wedge as recited in claim 1, wherein the second material in each wedge forms at least one damper bar extending axially through the respective wedge, wherein the at least one damper bar has an axial cross-section with a perimeter shaped for optimizing skin effect.

6. The wedge as recited in claim 1, wherein each wedge has two axially opposed end portions of a material more electrically conductive than the first material for electrical connection between the second material and rotor end plates.

7. The wedge as recited in claim 1, wherein the wedge body including the first and second material is additively manufactured.

8. A method of manufacturing a wedge for rotor of an electrical machine comprising:

additively manufacturing a wedge with a first member made of a first material and at least one second member made of a second material, the second material having a higher electrical conductivity than the first material, the at least one second member forming a Q-axis damper bar in the wedge, wherein the second member does not extend outside of the first member as a fastener, and wherein the second member can be electrically connected to an end ring, but does not act as a fastener to the end ring.

9. The method as recited in claim 8, wherein additively manufacturing includes additively manufacturing layers of a material with higher electrical conductivity than that of the first material on axially opposed end portions of the wedge body for electrical connection of the damper bar with end plates of a rotor.

10. The method as recited in claim 8, wherein the at least one second member is intimately radially surrounded by the first member, and the at least one second member has an arc-shaped cross section.

\* \* \* \* \*